(12) United States Patent
Howell

(10) Patent No.: US 7,578,116 B1
(45) Date of Patent: Aug. 25, 2009

(54) BATTERY-OPERATED RIDING ROTARY MOWER

(75) Inventor: Jeffrey Eugene Howell, Clanton, AL (US)

(73) Assignee: Richard D. Meyer, Clanton, AL (US)

( * ) Notice: Subject to any disclaimer, the term of this patent is extended or adjusted under 35 U.S.C. 154(b) by 0 days.

(21) Appl. No.: 12/188,784

(22) Filed: Aug. 8, 2008

Related U.S. Application Data

(60) Provisional application No. 60/955,115, filed on Aug. 10, 2007.

(51) Int. Cl.
*A01D 69/00* (2006.01)
(52) U.S. Cl. .................................................. 56/11.9
(58) Field of Classification Search .............. 56/10.2 G, 56/10.2 H, 10.5, 11.9, 10.2 E
See application file for complete search history.

(56) References Cited

U.S. PATENT DOCUMENTS

| | | | | |
|---|---|---|---|---|
| 3,460,325 | A * | 8/1969 | Musgrave | ................... 56/11.6 |
| 4,145,864 | A | 3/1979 | Brewster, Jr. | |
| 5,406,778 | A * | 4/1995 | Lamb et al. | ...................... 56/7 |
| 5,540,037 | A | 7/1996 | Lamb et al. | |
| 5,553,445 | A | 9/1996 | Lamb et al. | |
| 5,934,051 | A * | 8/1999 | Hahn | ..................... 56/10.2 R |
| 6,109,009 | A | 8/2000 | Benson | |
| 6,779,323 | B2 * | 8/2004 | Hancock et al. | ........... 56/10.2 J |

FOREIGN PATENT DOCUMENTS

JP 05015233 A * 1/1993

* cited by examiner

*Primary Examiner*—Alicia M Torres
(74) *Attorney, Agent, or Firm*—Gerald M. Walsh; Kenneth M. Bush; Bush Intellectual Property Law

(57) ABSTRACT

A riding lawnmower with a chassis having a rear portion with two rear wheels, and a cutting blade deck having one or more rotary blades. Batteries are positioned in a U-shaped array around the right side, left side, and rear end of the chassis, above and near the rear wheels to maintain a low center of gravity. The weight of the batteries is evenly distributed over the rear wheels to maintain balance. The batteries are connected in series to each other and to an electric motor. The electric motor is positioned within a central portion of the U-shaped array of batteries. A single electric motor drives both the rotary cutting blades and the rear wheels, which is made possible by placing the batteries near and above the rear wheels, and by positioning the electric motor under the seat.

7 Claims, 5 Drawing Sheets

BATTERY-OPERATED RIDING ROTARY MOWER

CROSS-REFERENCE TO RELATED APPLICATION

This patent application claims priority to U.S. Provisional Application No. 60/955,115, filed Aug. 10, 2007, the disclosure of which is incorporated herein by reference for all purposes.

BACKGROUND OF THE INVENTION

1. Field of the Invention

This invention relates generally to electric rotary lawnmowers and, more particularly, to battery-operated riding rotary lawnmowers.

2. Technical Background

Battery-operated riding mowers are known which have three wheels and reel-type blades in front of the vehicle. The reel blades rotate vertically in response to the forward motion of the mower. These mowers are useful mainly for mowing golf putting greens. Rotary blades are not suitable for these mowers because they would cause a lack of balance and be unstable. U.S. Pat. No. 4,145,864, issued to Brewster, discloses a battery-powered push rotary lawnmower. This lawnmower has a single motor, with a motor controller and potentiometer, which rotates a blade horizontally under the motor. The wheels are not powered by the motor. Although this type of battery operated rotary mower may be useful as a push-mower, there is no indication in the prior art that a battery-operated riding rotary lawnmower would be feasible or effective.

A battery-operated riding rotary lawnmower is desirable because it would operate cleaner, more dependably, and with less maintenance than a gasoline powered riding rotary lawnmower. The most efficient, cost-effective, and stable battery-operated riding rotary lawnmower would have four wheels and a single motor that drives both the rear wheels and the horizontal rotary cutting blades. Such a mower has not been available because no one has devised a practical way to integrate a plurality of batteries and a single electric motor to drive rear wheels and rotary blades on a four-wheeled chassis while maintaining balance and stability of the vehicle.

SUMMARY OF THE INVENTION

The present invention is a battery-operated riding rotary lawnmower in which a plurality of batteries is positioned in a U-shaped array around the right side, left side, and rear end of a chassis. The batteries are positioned above and near the rear wheels to maintain a low center of gravity. The weight of the batteries is evenly distributed over the rear wheels to maintain balance. This arrangement makes the vehicle stable and safe to operate. The batteries are connected in series to each other and to an electric motor. The electric motor is positioned between the batteries or within the interior portion of the U-shaped array of the batteries, under the seat, to further maintain a low center of gravity and balance. The electric motor is connected to a motor controller and potentiometer to control the speed of the motor. The motor has a first pulley to drive the rear wheels and a second pulley to operate rotary cutting blades.

An advantage of the present invention is a battery-operated riding rotary lawnmower which is safe, stable, efficient, and cost-effective.

Another advantage is a battery-operated riding rotary lawnmower that drives the wheels and rotary cutting blades with a single electric motor.

Another advantage is a battery-operated riding rotary lawnmower that is durable and easy to maintain.

Another advantage is a battery-operated riding rotary lawnmower which uses a system of drives which are easy and inexpensive to replace.

Another advantage is a battery-operated riding rotary lawnmower in which the batteries are rechargeable.

DETAILED DESCRIPTION OF THE PREFERRED EMBODIMENTS

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
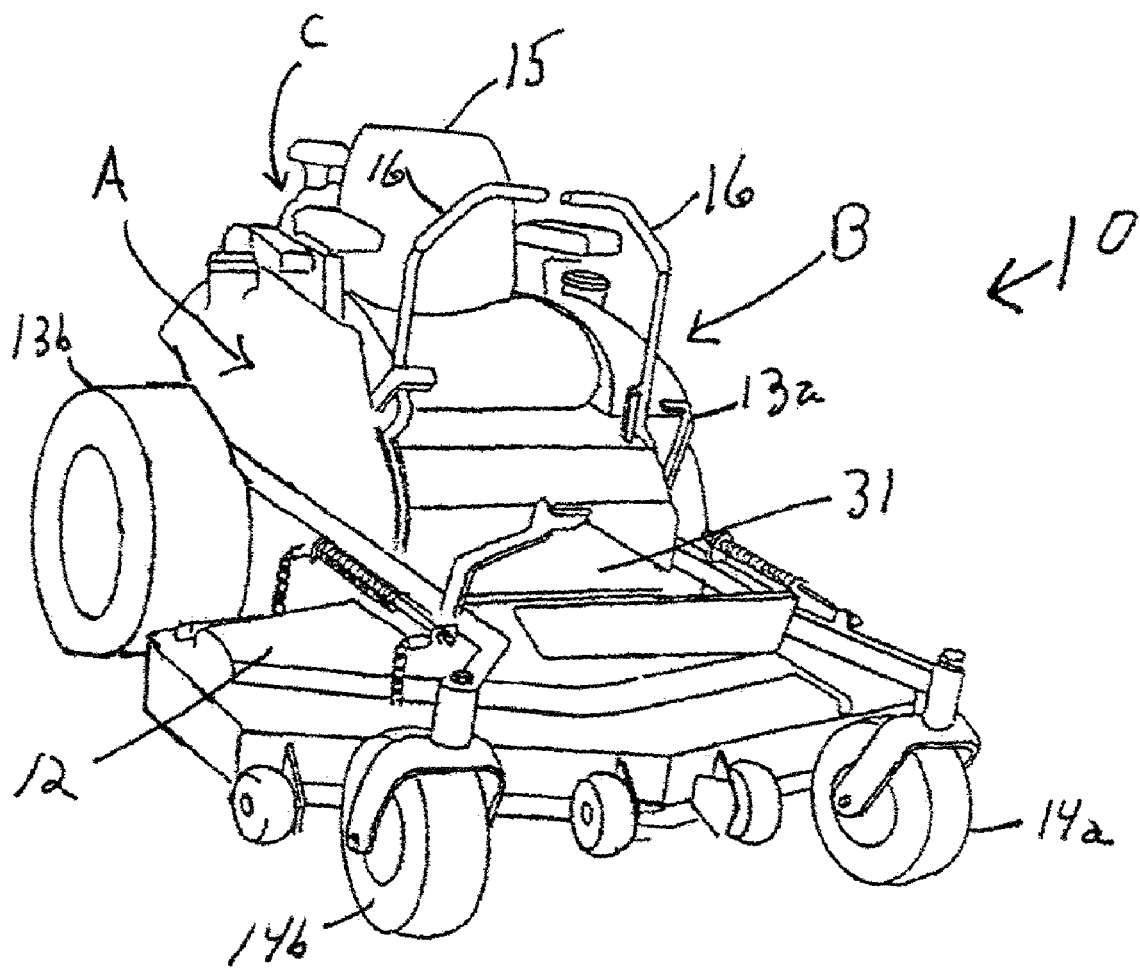
FIG. 1 shows an illustration of a riding rotary lawnmower which can be constructed to operate with batteries and a single electric motor.

FIG. 1 shows a perspective view of a riding lawnmower 10 which can be constructed to operate with batteries and a single drive motor. The mower 10 has a chassis 31, a cutting blade deck 12, a pair of rear wheels 13a, 13b, a pair of front wheels 14a, 14b, a seat 15, and motion control levers 16, typically provided with riding lawnmowers. The riding lawnmower of the present invention can have all of the features of gasoline powered riding rotary mowers, but without the gasoline engine. The rear wheels 13a, 13b are at the rear end of chassis 31. FIG. 1 shows an area A on the right side of mower 10, area B on the left side of mower 10, and area C at the rear end of mower 10. The batteries of the present invention are positioned in these areas around mower 10.

Figure 2:
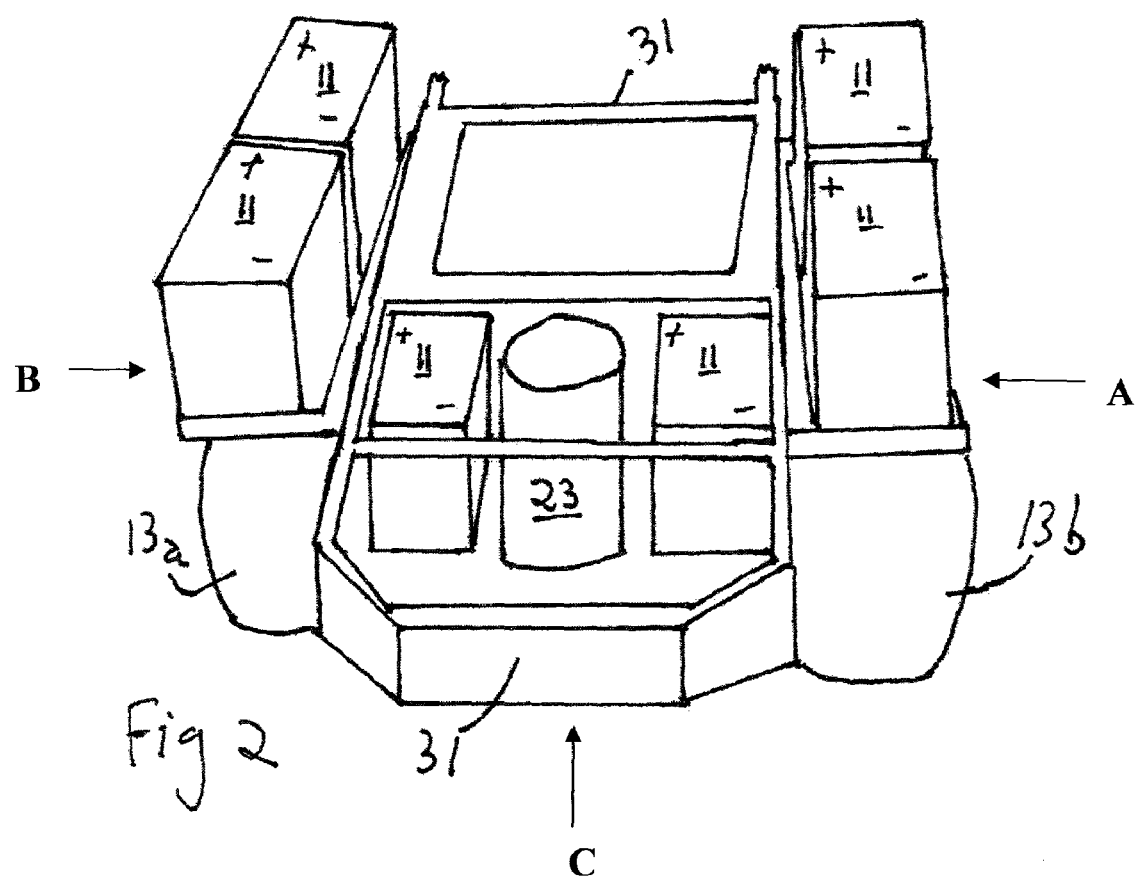
FIG. 2 shows a drawing of the chassis with an arrangement of 6 batteries.
Figure 3:
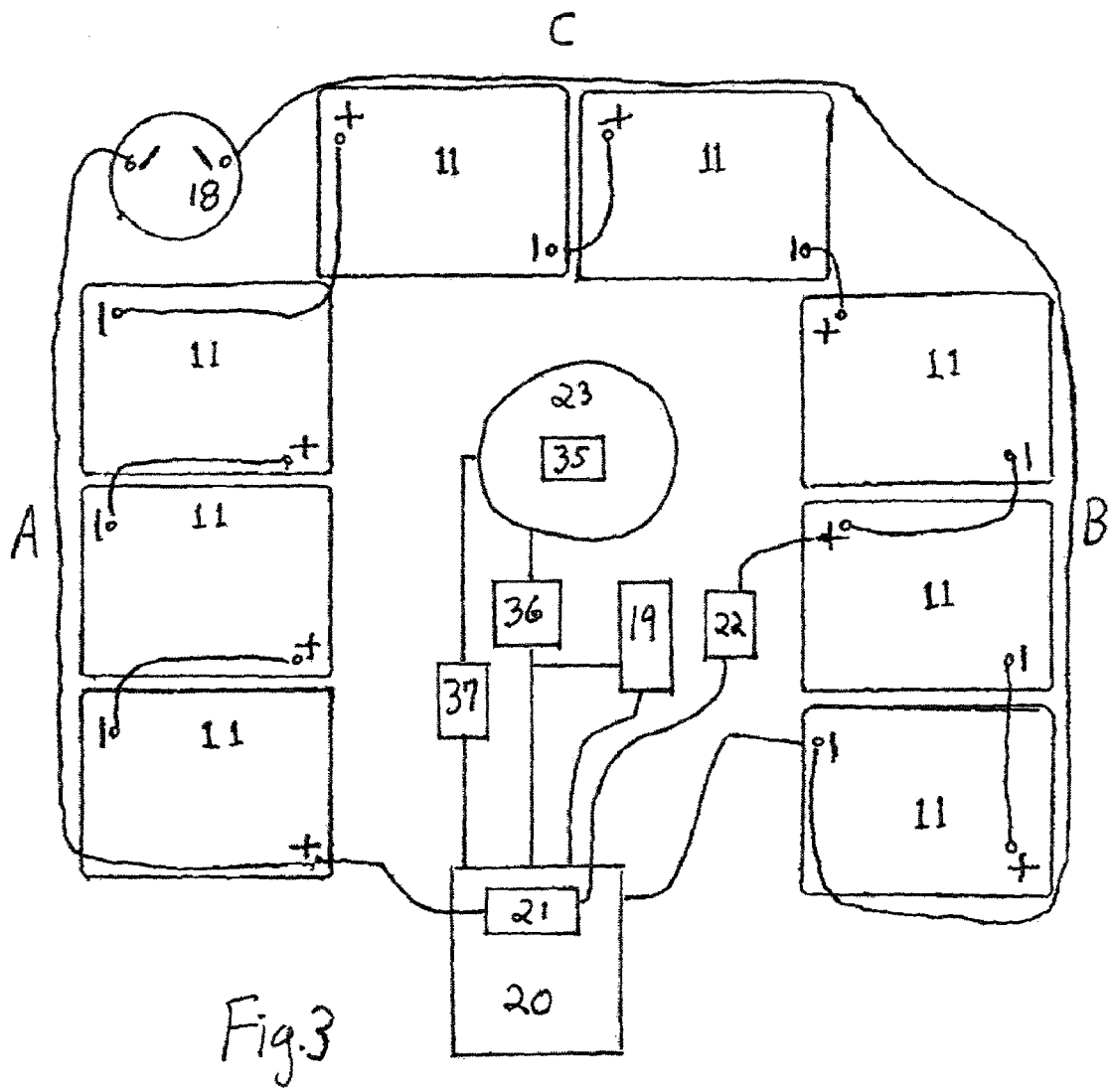
FIG. 3 shows the arrangement of 8 batteries around the back end of the lawnmower.

FIG. 2 shows the arrangement of the batteries 11 on chassis 31. Two batteries 11 are positioned over the left rear wheel 13a, two batteries over the right rear wheel 13b, and two batteries 11 next to rear wheels 13a and 13b. Motor 23 is positioned between the batteries 11 next to rear wheels 13a and 13b. In FIG. 3 eight batteries are shown in a U-shaped array suitable for positioning around the right side A, left side B, and rear end C of chassis 31. The batteries 11 are positioned over and near the rear wheels 13a, 13b to maintain a low center of gravity. The weight of the batteries 11 is evenly distributed over and next to the rear wheels 13a, 13b, and rear end C, to maintain balance. This arrangement makes the vehicle stable and safe to operate. Mower 10 can have 4 to 8 deep cycle batteries 11 wired in series. The electric motor 23 is positioned, preferably, under the seat 15 between the batteries 11 that are located over and next to the rear wheels 13a and 13b, or within the central portion of the U-shaped array of batteries 11, to further maintain a low center of gravity and balance. FIG. 3 also shows the relationship of electric motor 23 to other electrical components that are known to be required for proper function of a battery powered vehicle, including a charge receptacle 18, potentiometer 19, motor controller 20, solenoid 21, instrument panel 22, a tachometer 35, a speed controller 36, and a key switch 37. The motor controller 20 controls the speed and torque of electric motor 23, and can also perform other functions such as storing and providing information on the status of the electrical system and for responding to safety related conditions in the electrical system.

Figure 4:
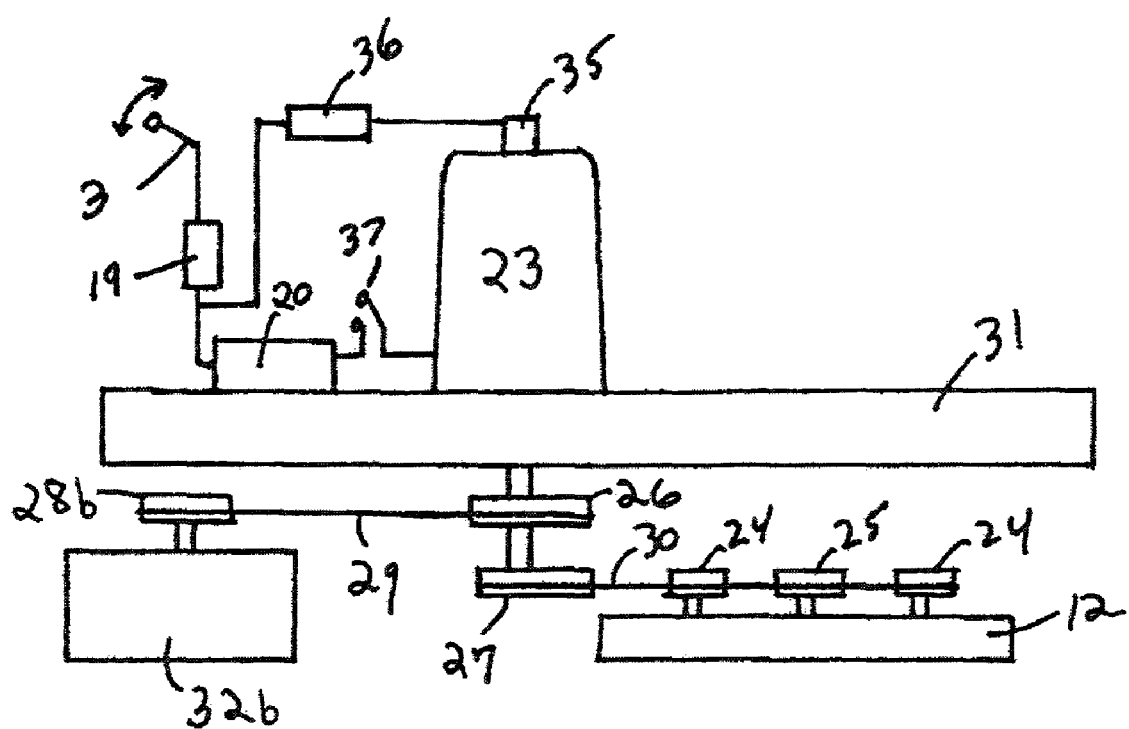
FIG. 4 shows a side view of the chassis, motor, and drive belt arrangements.
Figure 5:
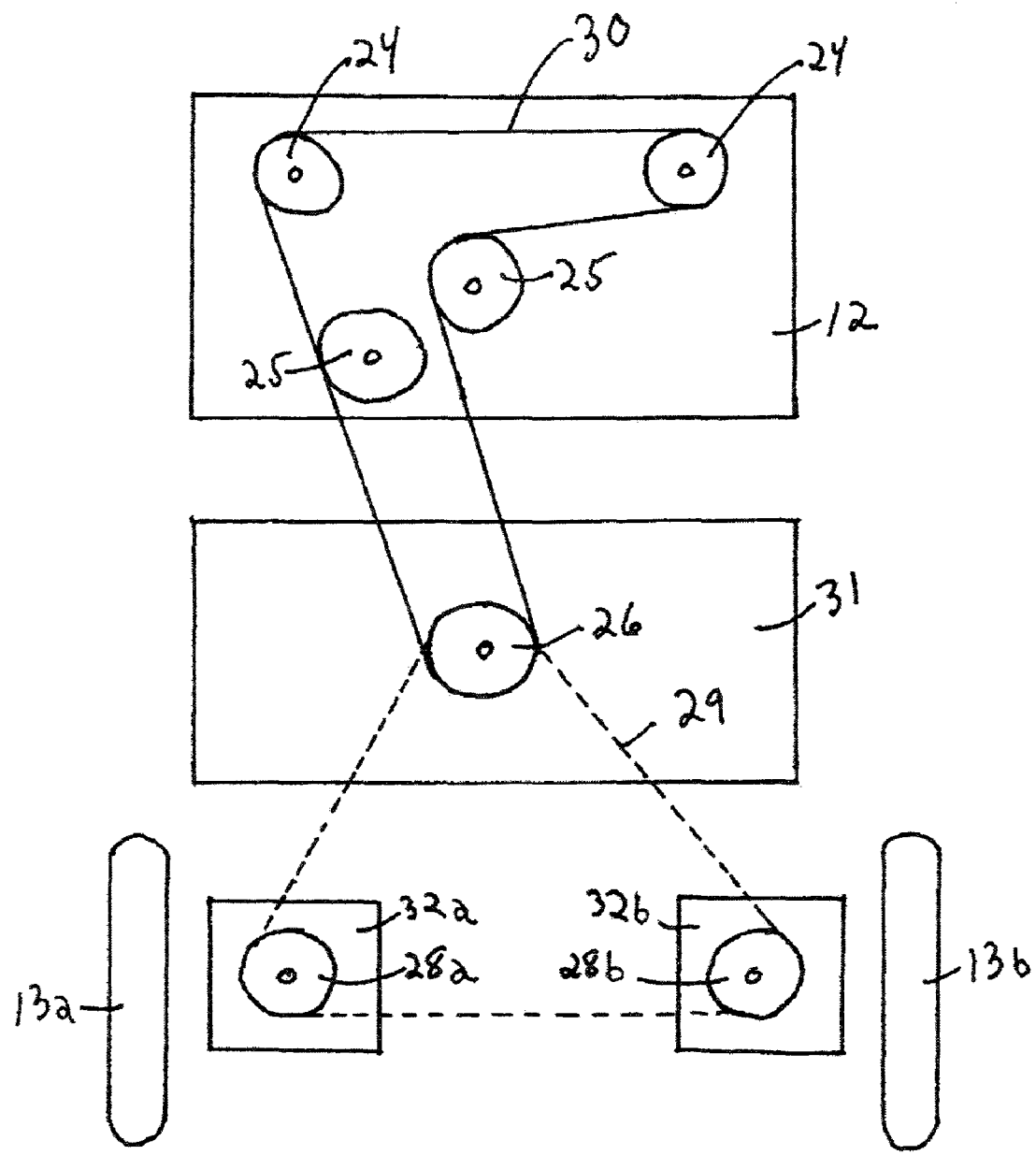
FIG. 5 shows a top view diagram of the drive belt arrangements.

FIG. 4 shows a side view of the chassis, motor, and drive belt arrangements. The relationship of motor 23 to motor controller 20, potentiometer 19, throttle 32, key switch 37, tachometer 35, and speed controller 36 are also shown. Motor 23 can be of any suitable horsepower, preferably about 15 to 50 horsepower. An AC motor can also be utilized instead of a DC motor. FIG. 5 shows a top view diagram of the pulley system which drives rotary cutting blades under deck 12 and transmissions 32a, 32b adjacent to each rear wheel 13a, 13b. Motor 23 is attached to a floor chassis 31 under seat 15. The shaft on motor 23 has an upper pulley 26 and a lower pulley 27. Lower pulley 27 has a belt 30 which extends along an idler pulley 25, then around a blade pulley 24a, around another blade pulley 24b, around another idler pulley 25, and back to lower pulley 27. As motor 23 turns it will cause pulleys 24a, 24b to rotate horizontal rotary blades under deck 12 to cut grass. Upper pulley 26 has a belt 29 which extends to pulleys 28a, 28b on hydraulic transmissions 32a, 32b next to rear wheel 13a, 13b. As motor 23 turns, it will cause pulley 26 to turn pulleys 28a, 28b to drive rear wheels 13a, 13b.

Thus, a single electric motor of the present invention drives both the rotary cutting blades and the rear wheels, providing a safe, stable battery-operated riding rotary lawnmower. This is made possible by the unique placement and orientation of the batteries 11 near and above the rear wheels 13a, 13b, and by positioning the electric motor 23 under the seat 15 and between the batteries 11 located over wheels 13a, 13b.

The foregoing description has been limited to specific embodiments of this invention. It will be apparent, however, that variations and modifications may be made by those skilled in the art to the disclosed embodiments of the invention, with the attainment of some of all of its advantages and without departing from the spirit and scope of the present invention. For example, the hydraulic transmissions at the two rear wheels can be replaced by separate individual electric motors, one for each wheel, that will power the rear wheels independent of the electric motor 23. These separate individual electric motors that power the wheels are also powered by batteries 11 and are under the control of the motion control levers 16. In addition to powering the rear wheels with individual electric motors, electric motor 23 can be replaced by one or more separate individual electric motors to power one or more rotary blades directly. More than one motor controller and more than one potentiometer can be used to control a plurality of motors. 6 volt to 12 volt batteries can be used. Any suitable type of instrument panel can be used. Any suitable type of deck lift lever may be employed.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A battery-operated riding rotary lawnmower, comprising:
    a) a chassis having a rear end with two rear wheels and a cutting blade deck having one or more rotary blades;
    b) a plurality of batteries positioned on the right side and left side of said chassis, wherein said plurality of batteries are positioned in a U-shaped array around the right side, left side, and rear end of said chassis;
    c) said batteries being positioned over and near said rear wheels to maintain a low center of gravity;
    d) the weight of said batteries being evenly distributed over and near said rear wheels to maintain balance;
    e) said batteries being connected in series to each other and to an electric motor; and
    f) said electric motor being positioned between said batteries.

2. The battery-operated riding rotary lawnmower of claim 1 wherein said chassis has a seat and said electric motor is positioned under said seat.

3. The battery-operated riding rotary lawnmower of claim 1 wherein said electric motor is connected to a motor controller and potentiometer to control the speed of the motor.

4. The battery-operated riding rotary lawnmower of claim 1 wherein said electric motor has a first pulley to drive said rear wheels with a first drive belt and a second pulley to drive said rotary blades with a second drive belt.

5. The battery-operated riding rotary lawnmower of claim 1 wherein said electric motor has a pulley to operate said rotary blades, and said rear wheels are driven by separate individual electric motors.

6. A battery-operated riding rotary lawnmower, comprising:
    a) a chassis having a rear end with two rear wheels, a cutting blade deck having one or more rotary blades, a seat, and an electric motor positioned under the seat;
    b) a plurality of batteries positioned in a U-shaped array around the right side, left side, and rear end of said chassis;
    c) said batteries being positioned over and near said rear wheels to maintain a low center of gravity;
    d) the weight of said batteries being evenly distributed over and near said rear wheels to maintain balance;
    e) said batteries being connected in series to each other and to an electric motor;
    f) said electric motor being positioned within a central portion of said U-shaped array of said batteries, and being connected to a motor controller and potentiometer to control the speed of said motor; and
    g) said electric motor having a first pulley to drive said rear wheels with a first drive belt and a second pulley to drive said rotary blades with a second drive belt.

7. A battery-operated riding rotary lawnmower, comprising:
    a) a chassis having a rear end with two rear wheels, a cutting blade deck having one or more rotary blades, a seat, and an electric motor positioned under the seat;
    b) a plurality of batteries positioned on the right side and left side of said chassis, wherein said plurality of batteries are positioned in a U-shaped array around the right side, left side, and rear end of said chassis;
    c) said batteries being positioned over and near said rear wheels to maintain a low center of gravity;
    d) the weight of said batteries being evenly distributed over and near said rear wheels to maintain balance;
    e) said batteries being connected in series to each other and to an electric motor;
    f) said electric motor being positioned between said batteries, and being connected to a motor controller and potentiometer to control the speed of said motor; and
    g) said electric motor having a pulley to operate said rotary blades, and said rear wheels being driven by separate individual electric motors.

* * * * *